United States Patent
Fruin et al.

(10) Patent No.: US 9,482,269 B2
(45) Date of Patent: Nov. 1, 2016

(54) SYSTEM FOR ISOLATING ELECTRICAL CURRENT IN A BEARING FOR USE IN AN AIRCRAFT STRUCTURE

(71) Applicant: Roller Bearing Company of America, Inc., Oxford, CT (US)

(72) Inventors: John W. Fruin, Trumbull, CT (US); Ben Anderson, Scarsdale, NY (US); Maura Simpson, Fairfield, CT (US); Andrew Henn, Monroe, CT (US); Kevin Bryant, Bridgeport, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 14/857,055

(22) Filed: Sep. 17, 2015

(65) Prior Publication Data

US 2016/0076584 A1    Mar. 17, 2016

Related U.S. Application Data

(60) Provisional application No. 62/051,877, filed on Sep. 17, 2014.

(51) Int. Cl.
| | |
|---|---|
| *F16C 17/24* | (2006.01) |
| *F16C 23/04* | (2006.01) |
| *F16C 33/74* | (2006.01) |
| *B64D 45/02* | (2006.01) |
| *F16C 33/20* | (2006.01) |

(52) U.S. Cl.
CPC ............... *F16C 17/24* (2013.01); *B64D 45/02* (2013.01); *F16C 23/043* (2013.01); *F16C 23/045* (2013.01); *F16C 33/74* (2013.01); *F16C 33/201* (2013.01)

(58) Field of Classification Search
CPC .... F16C 17/24; F16C 23/043; F16C 23/045; F16C 33/74; B64D 45/02
See application file for complete search history.

(56) References Cited

U.S. PATENT DOCUMENTS

| | | |
|---|---|---|
| 5,059,041 A | 10/1991 | Watanabe et al. |
| 5,069,559 A | 12/1991 | Muller et al. |
| 6,030,128 A | 2/2000 | Pontzer |
| 6,652,149 B2 | 11/2003 | Hokao et al. |
| 7,503,697 B2 | 3/2009 | Tsuji et al. |
| 8,393,791 B2 | 3/2013 | Thornton et al. |
| 8,632,251 B2 | 1/2014 | Moratz |
| 8,764,301 B2 | 7/2014 | Winkelmann et al. |

(Continued)

OTHER PUBLICATIONS

Extended European Search Report issued in corresponding EP Application No. 15185647.3, dated Mar. 11, 2016, pp. 1-7.

*Primary Examiner* — Thomas R. Hannon
(74) *Attorney, Agent, or Firm* — MKG, LLC

(57) ABSTRACT

A system for isolating electrical current in an aircraft structure includes a first structure a bearing having an outer race and an inner race and a liner disposed therebetween, the outer race having a second structure coupled thereto. A dielectric seal is secured to the outer race and engages the inner race. A conditionally non-conductive gas occupies a sealed chamber that defines a gap between the inner race and the outer race. The gap has a predetermined magnitude sufficient to prevent electrical arcing or current leakage between the inner race and the outer race at a first voltage less than that voltage resulting from a lightning strike; and/or to conduct an electrical current between the inner race and the outer race at a second voltage greater than or equal to the voltage resulting from the lightning strike.

10 Claims, 5 Drawing Sheets

(56) References Cited

U.S. PATENT DOCUMENTS

| | | |
|---|---|---|
| 2004/0081380 A1 | 4/2004 | Katagiri et al. |
| 2011/0038576 A1 | 2/2011 | Thornton et al. |
| 2014/0016888 A1 | 1/2014 | Harper et al. |
| 2014/0205222 A1 | 7/2014 | Biggs et al. |
| 2014/0341741 A1* | 11/2014 | Nieuwenhuizen .. F03D 11/0008 416/174 |
| 2015/0003767 A1* | 1/2015 | Leferink ................. F16C 41/00 384/495 |
| 2015/0357876 A1* | 12/2015 | Eriksen ................... F03D 9/002 290/55 |
| 2016/0153287 A1* | 6/2016 | Roach ...................... C25D 7/00 415/119 |

* cited by examiner

SYSTEM FOR ISOLATING ELECTRICAL CURRENT IN A BEARING FOR USE IN AN AIRCRAFT STRUCTURE

CROSS REFERENCE TO RELATED APPLICATIONS

This patent application claims the benefit of U.S. Provisional Patent Application Ser. No. 62/051,877, filed on Sep. 17, 2014, which is hereby incorporated by reference in its entirety.

FIELD OF THE INVENTION

The present invention relates generally to a system for isolating electrical current in a bearing for use in an aircraft structure, and more specifically to a sealed chamber in the bearing and a conditionally non-conductive gas that fluidly occupies the sealed chamber.

BACKGROUND OF THE INVENTION

In order to reduce weight and increase structural strength, aircraft are increasingly using composite materials, which often are non-conductive. Aircraft also have to manage electrical currents caused by electromagnetic effects (EME) such as those caused by lightning, radio towers, and static discharge by providing conductive paths and electrical isolation where required. EME such as lightning may have large currents and high voltages capable of producing electrical arcing across exposed surfaces. In aircraft made with non-conductive composite materials, good electrical paths are required to dissipate EME energy, and good electrical isolation is required to protect sensitive equipment and fluids. Bonding and grounding requirements for aircraft electrical systems such as wing ice protection systems must also be provided for.

Aircraft leading edge structures such as slats with track arms and other aircraft structures are generally designed to have grounding paths to dissipate EME energy, for example through bearings employed in such structures. However, for normal operation, the electrical system has an electrical current return network for grounding the electrical system. It may be desirable that the electrical system conduct ground current through the current return network during normal operation and not through the aircraft structure ground paths used for EME.

As shown in FIG. 4, a conditionally non-conductive material 101 can be disposed between or coated on parts of the bearing 120 to provide electrical isolation for lower voltages for bonding and grounding purposes, while providing a conductive path for EME purposes such as conducting large voltages of lightning strikes. However, use of such conditionally non-conductive material 101 typically requires that the material be applied between bearing components that by design require freedom of relative motion. As shown in FIG. 5, after the bearing components 120 are misaligned, the coating material 101 tears leaving areas 111 uncoated and thereby terminating the electrical isolation.

SUMMARY OF THE INVENTION

There is disclosed herein a system for isolating electrical current in an aircraft structure. The system includes a first structure, a second structure and a bearing mounted therebetween. The bearing includes an outer race defining an outer race inner surface and an outer race side surface. The bearing also includes an inner race disposed partially in the outer race and coupled to the first structure. The inner race defines an inner race outer surface. A liner is disposed between the outer race inner surface and the inner race outer surface. The second structure is coupled to the outer race. The bearing includes a dielectric seal secured to the outer race side surface and sealingly and slidingly engaging the inner race outer surface. The bearing includes a sealed chamber defined by the dielectric seal, the outer race inner surface, the inner race outer surface and an edge of the liner. A conditionally non-conductive gas (e.g., air) for conditionally electrically isolating the first structure from the second structure fluidly occupies the sealed chamber. The sealed chamber defines a minimum gap between the inner race outer surface and the outer race inner surface. The gap has a predetermined magnitude sufficient to prevent electrical arcing or current leakage between the inner race outer surface and the outer race inner surface at a first voltage. The first voltage is less than a threshold voltage (e.g., less than about 350 volts and/or less than a voltage resulting from a lightning strike). The gap also has a predetermined magnitude sufficient to conduct an electrical current between the inner race outer surface and the outer race inner surface at a second voltage. The second voltage is greater than or equal to the threshold voltage (e.g., greater than or equal to 350 volts and/or less than a voltage resulting from a lightning strike). The threshold voltage is such that at normal operation, voltage differences between aircraft components supported by the bearing will be less than this threshold voltage. During a non-normal operational event (such as a lightning strike), the voltage between bearing connected components can be greater than the threshold voltage.

In one embodiment, the conditionally non-conductive gas has an electrical resistance, at the gap, of a magnitude sufficient to cause the electrical current to preferentially flow through the gap, instead of through the liner.

In one embodiment, the conditionally non-conductive gas is operable to electrically isolate the first structure from the second structure if the first voltage is less than a voltage threshold, and electrically coupling the first structure to the second structure if the second voltage is greater than the voltage threshold.

DETAILED DESCRIPTION

Figure 1:
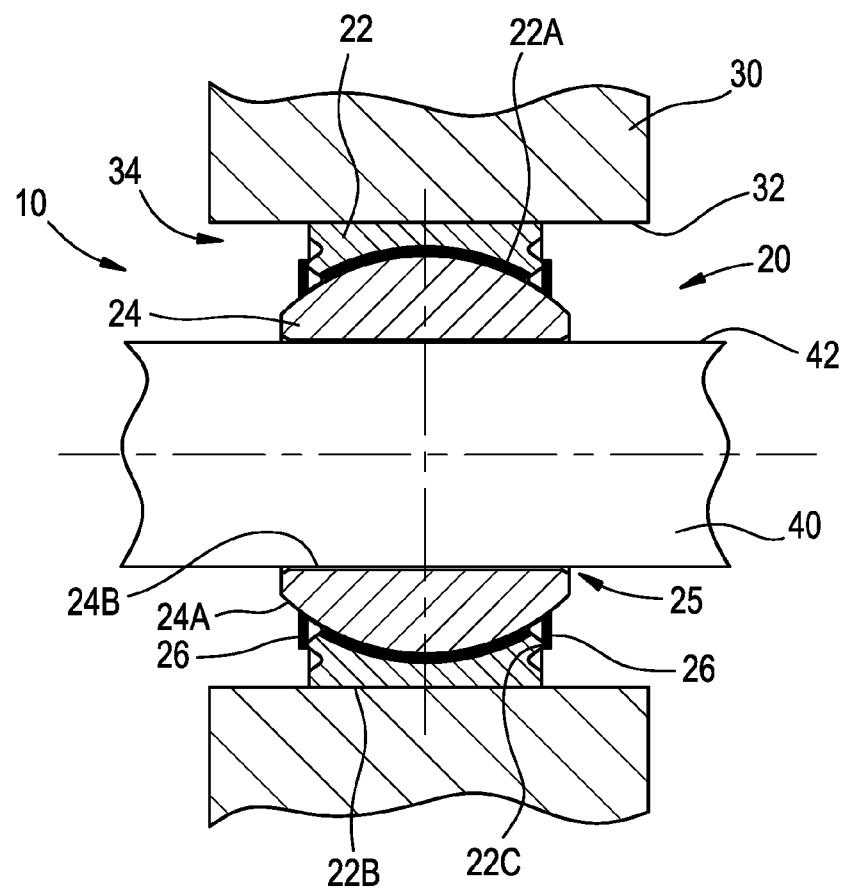
FIG. 1 is a cross sectional view of a system of isolating electrical current in an aircraft structure and shown positioned in a bearing mounted in the aircraft structure.

As shown in FIG. 1, a system for isolating electrical current in an aircraft structure, hereinafter "the isolation system," is generally indicated by the numeral 10. The isolation system 10 includes a bearing 20 moveably coupled to and positioned between an electrically conductive first structure 30, for example a frame, and an electrically conductive second structure 40, for example, a shaft. The first structure 30 has an interior surface 32 defining a bore 34 extending through the first structure 30. The second structure 40 has a cylindrical exterior surface 42 thereon.

Figure 2:
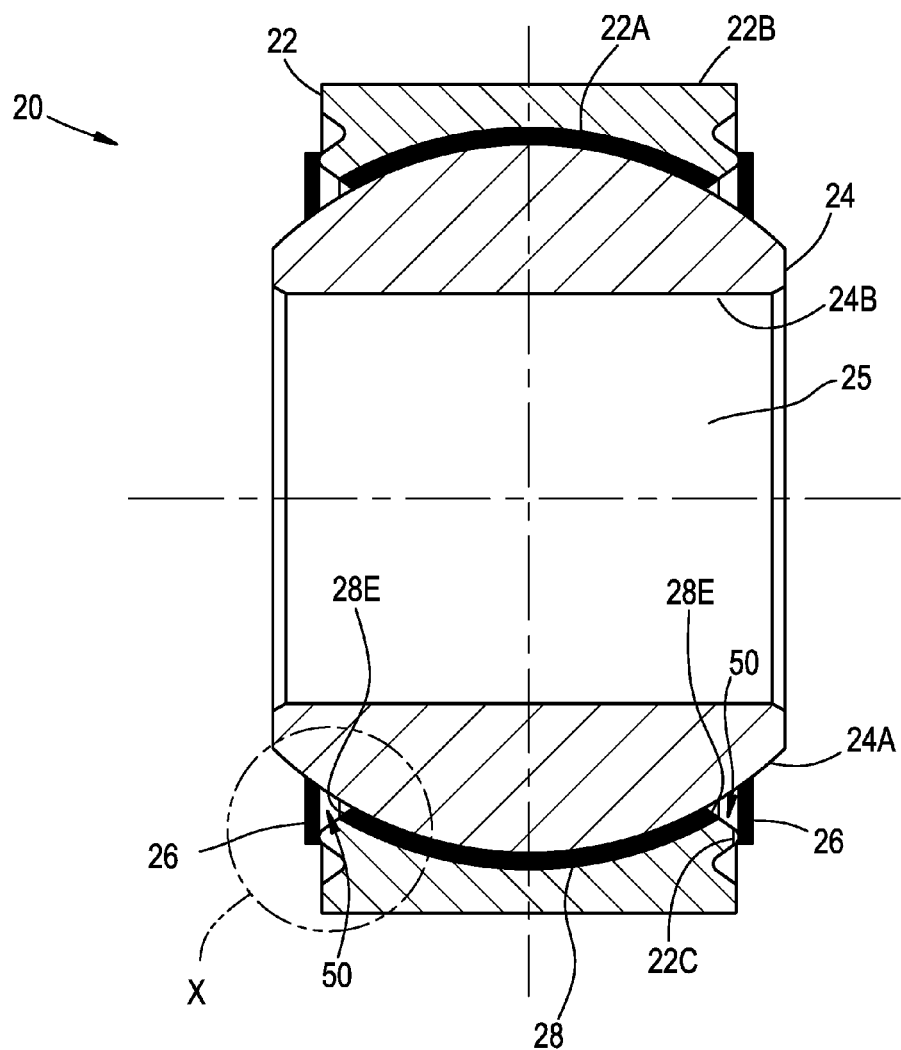
FIG. 2 is a cross sectional view of the bearing of FIG. 1.
Figure 3:
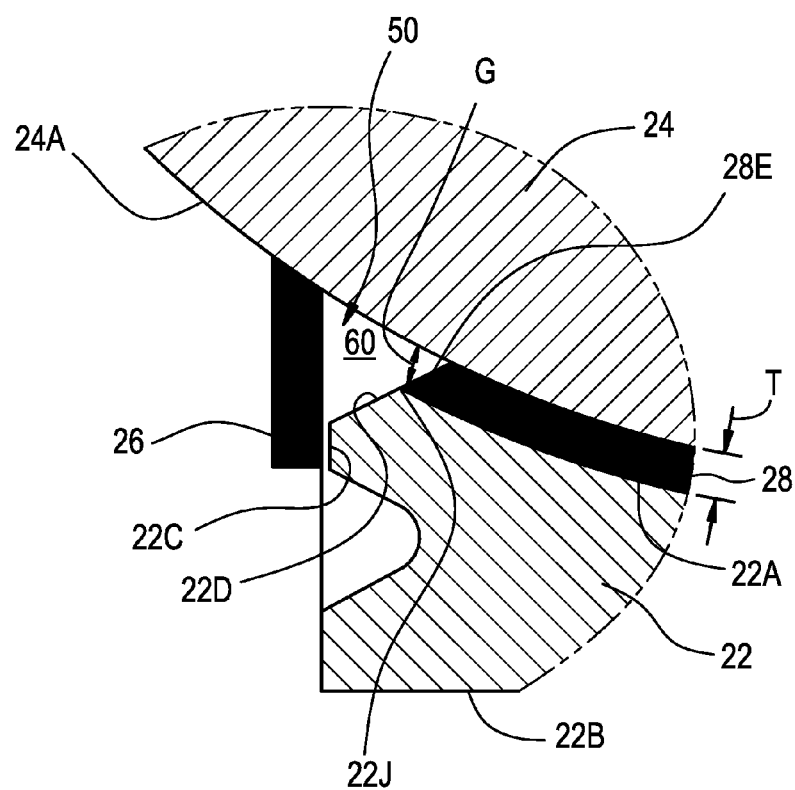
FIG. 3 is an enlarged view of the portion X of the bearing of FIG. 2.
Figure 4:
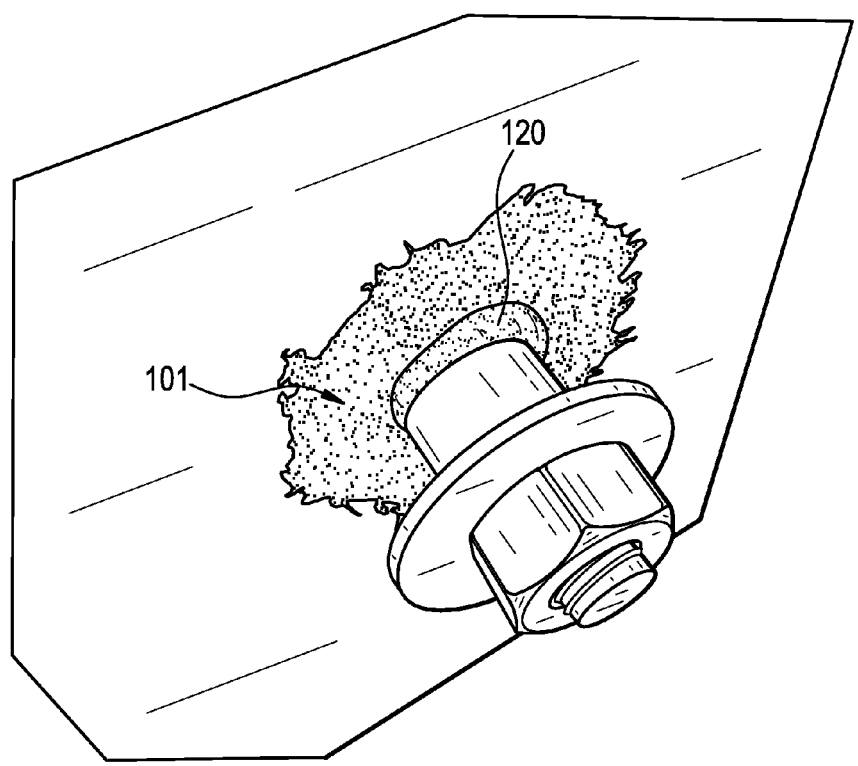
FIG. 4 is a photograph of a prior art bearing shown with a sealant applied thereto and installed in a test housing.
Figure 5:
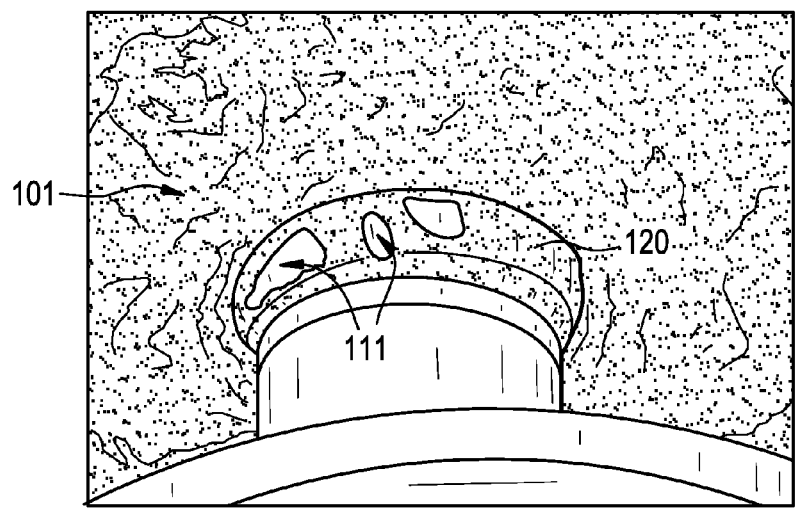
FIG. 5 is a photograph of the bearing of FIG. 4 shown after the sealant cured and after misalignment of an inner member of the bearing relative to an outer member of the bearing.

The bearing 20 illustrated in FIGS. 1-3 is a spherical bearing which includes an electrically conductive outer race 22 and an electrically conductive inner race 24 partially disposed in the outer race 22. The outer race 22 defines a spherical outer race inner surface 22A, a cylindrical outer race exterior surface 22B and an outer race side surface 22C. A beveled portion 22D extends between the spherical outer race inner surface 22A and the outer race side surface 22C. A juncture 22J is defined at a transition from the spherical outer race inner surface 22A to the beveled portion 22D. The inner race 24 defines a spherical outer surface 24A and a cylindrical inner surface 24B that defines a bore 25 extending through the inner race 24. The outer race 22 is coupled to the first structure 30. In particular, the cylindrical outer race exterior surface 22B is positioned in the bore 34, for example by press fitting, so that the cylindrical outer race exterior surface 22B engages and is in electrical communication with the interior surface 32 of the first structure 30. A portion of the second structure 40 is positioned in the bore 25 so that the cylindrical exterior surface 42 engages and is in electrical communication with the cylindrical inner surface 24B. While the bearing 20 is shown and described as a spherical bearing, the present invention is not limited in this regard as other types of bearings may be employed including but not limited to journal bearings and bushings.

The bearing 20 includes a dielectric seal 26 secured (e.g., via an adhesive) to each of opposing ones of the outer race side surface 22C and sealingly and slidingly engages the inner race outer surface 24A. The seal 26 prevents contaminants from entering into an area between the inner race 24 and the outer race 22. The seal 26 is manufactured from any suitable dielectric material including but not limited to Polytetrafluoroethylene (PTFE), rubber and plastic.

A liner 28 is disposed between the spherical outer race inner surface 22A and the inner race outer surface 24A. The liner 28 extends between opposing edge portions 28E. The liner 28 is of a continuous form absent any holes, perforations, slits, discontinuities or the like extending therethrough. In one embodiment, the liner 28 is secured to the spherical outer race inner surface 22A and slidingly engages the spherical outer surface 24A. In one embodiment, the liner 28 is secured to the spherical outer surface 24A and slidingly engages the spherical outer race inner surface 22A. The liner 28 is manufactured from a self-lubricating material such as PTFE. As shown in FIG. 3, the liner 28 has a thickness T.

The thickness T of the liner 28 is configured to prevent electrical arcing between the outer surface 24A of the inner race 24 and the outer race inner surface 22A for low level voltages experienced during normal operation, including low level voltage malfunctions or excursions. For example, the thickness T of the liner is of a sufficient magnitude to prevent electrical arcing between the outer surface 24A of the inner race 24 and the outer race inner surface 22A at voltages up to about 350 volts RMS or 350 volts AC.

The thickness T of the liner 28 is configured to limit electrical current leakage between the outer surface 24A of the inner race 24 and the outer race inner surface 22A for low level voltages experienced during normal operation, including low level voltage malfunctions or excursions. For example, the thickness T of the liner 28 is configured to limit electrical current leakage between the outer surface 24A of the inner race 24 and the outer race inner surface 22A at voltages up to about 350 volts RMS or 350 volts AC, to a predetermined magnitude of current leakage.

Low-voltage isolation tests were performed at low level voltages, for example at 350 volts RMS, on the bearing 20. The test is considered failed if: 1) electrical arcing or sparking is observed; or 2) current leakage exceeds 1 mA, and equivalent resistance calculated (per V=IR, with measured values of V (voltage) and I (current)) is less than 2 kilo-ohms.

In one embodiment, the liner 28 is configured to prevent electrical arcing between the outer surface 24A of the inner race 24 and the outer race inner surface 22A at a voltage resulting from a lightning strike. In one embodiment, the liner 28 is configured to prevent electrical arcing between the outer surface 24A of the inner race 24 and the outer race inner surface 22A at a voltage resulting from a lightning strike, without incurring damage to the liner 28 or requiring replacement of the liner. In one embodiment, the liner 28 is configured to conduct current between the outer surface 24A of the inner race 24 and the outer race inner surface 22A at a voltage resulting from a lightning strike.

In one embodiment, the thickness T of the liner 28 is about 0.015"±0.001 inches. While the thickness T of the liner 28 is described as being about 0.015"±0.001 inches, the present invention is not limited in this regard as other thickness may be employed including but not limited to the thickness T being about 0.005 to about 0.025 inches.

As shown in FIG. 2, the bearing 20 includes an annular sealed chamber 50 proximate each axial end of the outer race 22 and extending around the inner race 24. As best shown in FIG. 3, the sealed chamber is defined by the dielectric seal 26, the spherical outer surface 24A of the inner race 24, the beveled portion 22D of the outer race 22 and the edge portion 28E of the liner 28. A gap G extends a minimum distance between the juncture 22J and the spherical outer surface 24A. In one embodiment the gap G is equal to the thickness T of the liner 28 and is about 0.015"±0.001 inches thick. A conditionally non-conductive (e.g., an electrical isolator or dielectric) medium or fluid 60 for conditionally electrically isolating the first structure from the second structure occupies and is contained in the sealed chamber 50. In one embodiment, the conditionally non-conductive fluid 60 is a gas, such as for example, air or nitrogen. The sealed chamber 50 is configured to contain the conditionally non-conductive fluid 60 upon misalignment of the inner race 24 relative to the outer race 22. While the gap G of the liner 28 is described as being about 0.015"±0.001 inches, the present invention is not limited in this regard as other magnitudes of the gap G may be employed including but not limited to about 0.005 to about 0.025 inches.

The sealed chamber 50 and, in particular, the gap G located in the sealed chamber 50 is sized to conditionally electrically isolate the first structure 30 from the second structure 40 if a first electrical voltage is less than a voltage threshold (e.g., a voltage threshold of 350 volts RMS or 350 volts AC), and electrically couple the first structure 30 to the second structure 40 if a second electrical voltage is greater than the voltage threshold, for example a high voltage level (e.g., greater than 350 volts, a peak voltage of 10 kV or a peak voltage of 15 kV) such as that resulting from a lightning strike.

With the conditionally non-conductive fluid 60 fluidly occupying the sealed chamber 50, the gap G is configured to prevent electrical arcing between the outer surface 24A of the inner race 24 and the outer race inner surface 22A for low level voltages experienced during normal operation, including low level voltage malfunctions or excursions. In one embodiment, with the conditionally non-conductive fluid 60 fluidly occupying the sealed chamber 50, the gap G has a predetermined magnitude (e.g., 0.015"±0.001 inches) sufficient to prevent electrical arcing between the outer surface 24A of the inner race 24 and the outer race inner surface 22A at a voltage up to about 350 volts RMS or 350 volts AC.

With the conditionally non-conductive fluid 60 fluidly occupying the sealed chamber 50, the gap G is configured to limit electrical current leakage between the outer surface 24A of the inner race 24 and the outer race inner surface 22A for low level voltages experienced during normal operation, including low level voltage malfunctions or excursions. In one embodiment, with the conditionally non-conductive fluid 60 fluidly occupying the sealed chamber 50, the gap G has a predetermined magnitude (e.g., 0.015"±0.001 inches) sufficient to limit electrical current leakage between the outer surface 24A of the inner race 24 and the outer race inner surface 22A at a voltage up to about 350 volts RMS or 350 volts AC between the outer race inner surface and the inner race outer surface.

In one embodiment, with the conditionally non-conductive fluid 60 fluidly occupying the sealed chamber 50, the gap G has a predetermined magnitude (e.g., 0.015"±0.001 inches) sufficient to conduct an electrical current between the outer surface 24A of the inner race 24 and the outer race inner surface 22A at a voltage greater than 350 volts AC (e.g., a voltage resulting from a lightning strike, 10 kV or 15 kV or greater). In one embodiment, the conditionally non-conductive fluid 60 fluidly occupying the sealed chamber 50 has an electrical resistance, at the gap G, of a magnitude sufficient to cause the electrical current to preferentially flow through the gap G, instead of through the liner 28. In one embodiment, the conditionally non-conductive fluid 60 fluidly occupying the sealed chamber 50 has an electrical resistance, at the gap G, of a magnitude sufficient to cause the electrical current to flow through the gap G, instead of through the liner 28, without causing damage to the liner 28 or requiring replacement of the liner 28.

In a lightning strike test a waveform profile pulse with peak voltage set to 15 kV is applied to the bearing 20 via the first structure 30. The test is considered failed if breakdown does not occur (i.e. isolation is maintained, and current does not flow between the outer race 22 and inner race 24.

Although the present invention has been disclosed and described with reference to certain embodiments thereof, it should be noted that other variations and modifications may be made, and it is intended that the following claims cover the variations and modifications within the true scope of the invention.

What is claimed is:

1. A system for isolating electrical current in an aircraft structure, the system comprising:
    a first structure;
    a bearing comprising:
        an outer race defining an outer race inner surface and an outer race side surface;
        an inner race disposed partially in the outer race and coupled to the first structure, the inner race defining an inner race outer surface; and
        a liner disposed between the outer race inner surface and the inner race outer surface;
    a second structure coupled to the outer race;
    a dielectric seal secured to the outer race side surface and sealingly and slidingly engaging the inner race outer surface;
    a sealed chamber defined by the dielectric seal, the outer race inner surface, the inner race outer surface and an edge of the liner;
    a conditionally non-conductive gas for conditionally electrically isolating the first structure from the second structure, the conditionally non-conductive gas fluidly occupying the sealed chamber; and
    the sealed chamber defines a minimum gap between the inner race outer surface and the outer race inner surface, the gap has at least one of:
        a predetermined magnitude sufficient to prevent electrical arcing or current leakage between the inner race outer surface and the outer race inner surface at a first voltage, the first voltage being less than a voltage resulting from a lightning strike; and
        a predetermined magnitude sufficient to conduct an electrical current between the inner race outer surface and the outer race inner surface at a second voltage, the second voltage being at least as great as the voltage resulting from the lightning strike.

2. The system of claim 1, wherein the conditionally non-conductive gas has an electrical resistance, at the gap, of a magnitude sufficient to cause the electrical current to preferentially flow through the gap, instead of through the liner.

3. The system of claim 1, wherein the conditionally nonconductive gas is air.

4. The system of claim 1, wherein the conditionally non-conductive gas is operable to electrically isolate the first structure from the second structure if the first voltage is less than a threshold voltage, and electrically coupling the first structure to the second structure if the second voltage is greater than the threshold voltage.

5. The system of claim 1, wherein the bearing is one of a spherical bearing, a bushing, and a journal bearing.

6. The system of claim 1, wherein the dielectric seal comprises at least one of polytetrafluoroethylene, plastic and rubber.

7. The system of claim 1, wherein the liner is a continuous form.

8. The system of claim 1, wherein the second voltage is at least about 350 volts.

9. The system of claim 1, wherein the liner is configured to limit electrical current leakage from the inner race outer surface and the outer race inner surface at the second voltage.

10. The system of claim 1, wherein the liner is configured to prevent electrical arcing between the inner race outer surface and the outer race inner surface at the second voltage.

* * * * *